US006847189B2

(12) United States Patent
Frank

(10) Patent No.: US 6,847,189 B2
(45) Date of Patent: Jan. 25, 2005

(54) METHOD FOR CONTROLLING THE OPERATING CHARACTERISTICS OF A HYBRID ELECTRIC VEHICLE

(75) Inventor: Andrew A. Frank, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/606,128

(22) Filed: Jun. 24, 2003

(65) Prior Publication Data

US 2004/0060751 A1 Apr. 1, 2004

Related U.S. Application Data

(63) Continuation of application No. PCT/US02/00220, filed on Jan. 3, 2002, application No. 10/606,128, which is a continuation-in-part of application No. 09/677,288, filed on Oct. 2, 2000, which is a continuation of application No. PCT/US99/09880, filed on May 17, 1999, which is a continuation-in-part of application No. 09/063,993, filed on Apr. 21, 1998, now Pat. No. 6,054,844, application No. 10/606,128, which is a continuation-in-part of application No. 09/063,995, filed on Apr. 21, 1998, now Pat. No. 6,116,363, which is a continuation-in-part of application No. 08/963,037, filed on Nov. 3, 1997, now Pat. No. 5,842,534, which is a continuation of application No. 08/455,104, filed on May 31, 1995, now abandoned.

(60) Provisional application No. 60/259,662, filed on Jan. 3, 2001.

(51) Int. Cl.$^7$ .................................................. H02J 7/00
(52) U.S. Cl. ...................................................... 320/104
(58) Field of Search ................. 320/104; 180/65.2–65.4, 180/65.6, 65.8, 165; 60/716, 718, 706, 711; 290/17, 4 R, 4 C; 322/16

(56) References Cited

U.S. PATENT DOCUMENTS 4,407,132 A    10/1983    Kawakatsu et al. ........... 60/176

(List continued on next page.)

FOREIGN PATENT DOCUMENTS

EP           0 423 536 A1    10/1989

OTHER PUBLICATIONS

Yang, D. et al.; "On the Use of Engine Modulation for Deceleration Control of Continuously Variable Transmission Vehicles," Society of Automotive Engineers, Inc., Technical Paper 850490, pp. 2.636 to 2.653, (1986).

Yang, D. et al.; "An Optimization Technique for the Design of a Continuously Variable Transmission Control System for Automobiles," International Journal of Vehicle Design, vol. 6, No. 1, pp. 41 thru 54, Jan. 1985.

Chan, C. et al.; "System Design and Control Considerations of Automotive Continously Variable Transmissions," Society of Automotive Engineers, Inc. Technical Paper 840048, pp. 1 thru 10, Feb. 1984.

(List continued on next page.)

Primary Examiner—Pia Tibbits
(74) Attorney, Agent, or Firm—John P. O'Banion

(57) ABSTRACT

A control method for operating internal combustion engine electric hybrid vehicles with smaller battery packs, particularly in configurations where an electric motor (E/M) or electric motor/generator (E/MG), a battery, and associated controls are inserted between the engine and a continuously variable or automatic transmission. The interaction between the combustion engine and battery operated electric motor is controlled by taking energy into the batteries only if it is more efficient than throttling the engine and operating the engine at a lower efficiency. Additionally, the batteries are charged to a certain state or the batteries are maintained at a particular state of charge. A goal of the invention is to obtain the best possible fuel economy while maintaining good driveability.

9 Claims, 7 Drawing Sheets

U.S. PATENT DOCUMENTS

| | | | |
|---|---|---|---|
| 4,445,329 A | 5/1984 | Drisko | 60/431 |
| 4,470,476 A | 9/1984 | Hunt | 180/65.2 |
| 4,947,953 A | 8/1990 | Morimoto | 180/179 |
| 5,002,020 A | 3/1991 | Kos | 123/46 E |
| 5,327,987 A | 7/1994 | Abdelmalek | 180/65.2 |
| 5,345,154 A | 9/1994 | King | 318/49 |
| 5,495,906 A | 3/1996 | Furutani | 180/65.2 |
| 5,722,911 A | 3/1998 | Ibaraki et al. | 477/3 |
| 5,786,640 A | 7/1998 | Sakai et al. | 290/17 |
| 5,788,004 A | 8/1998 | Friedmann et al. | 180/65.2 |
| 5,789,882 A | 8/1998 | Ibaraki et al. | 318/148 |
| 5,806,617 A | 9/1998 | Yamaguchi | 186/65.2 |
| 5,839,533 A | 11/1998 | Mikami et al. | 180/165 |
| 5,841,201 A | 11/1998 | Tabata et al. | 290/40 C |
| 5,842,534 A | 12/1998 | Frank | 186/65.2 |
| 5,846,155 A | 12/1998 | Taniguchi et al. | 477/2 |
| 5,875,864 A | 3/1999 | Yano et al. | 180/65.4 |
| 5,899,286 A | 5/1999 | Yamaguchi | 180/65.3 |
| 5,910,722 A | 6/1999 | Lyons et al. | 320/104 |
| 5,929,595 A | 7/1999 | Lyons et al. | 320/104 |
| 5,941,328 A | 8/1999 | Lyons et al. | 180/65.1 |
| 6,054,844 A | 4/2000 | Frank | 322/16 |
| 6,090,007 A | 7/2000 | Nakajima et al. | 477/46 |
| 6,098,733 A | 8/2000 | Ibaraki et al. | 180/65.2 |
| 6,110,066 A | 8/2000 | Nedungadi et al. | 475/5 |
| 6,116,363 A | 9/2000 | Frank | 180/65.2 |
| 6,209,672 B1 * | 4/2001 | Severinsky | 180/65.2 |
| 6,344,732 B2 | 2/2002 | Suzuki | 320/132 |
| 6,664,651 B1 * | 12/2003 | Kotre et al. | 290/29 |

OTHER PUBLICATIONS

Brace, C.J. et al.; "Operating Point Optimisor for Integrated Diesel/CVT Powertrain," Application of Powertrain and Fuel Technologies to Meet Emissions Standards for the 21st Century, Seminar Code C517, pp. 1 thru 8, Jun. 24–26, 1996.

Brace, C.J. et al.; "Integrated Passenger Car Diesel CVT Powertrain Control for Economy and Low Emissions," IMechE International Seminar S540, Advanced Vehicle Transmissions and Powertrain Management, pp. 1 thru 8, Sep. 25–26, 1997.

International Search Report, PCT International patent application No. PCT/US02/00220, pp. 1 thru 5, Jun. 14, 2002.

International Search Report, PCT International patent application No. PCT/US99/09880, pp. 1 thru 3, Aug. 2, 1999.

* cited by examiner

METHOD FOR CONTROLLING THE OPERATING CHARACTERISTICS OF A HYBRID ELECTRIC VEHICLE

CROSS-REFERENCE TO RELATED APPLICATIONS

This application claims priority from, and is a 35 U.S.C. § 111(a) continuation of, co-pending PCT international application serial number PCT/US02/00220 filed on Jan. 3, 2002 which designates the U.S., and which claims priority from U.S. provisional application Ser. No. 60/259,662 filed on Jan. 3, 2001, incorporated herein by reference. This application is also a continuation-in-part of U.S. application Ser. No. 09/677,288 filed on Oct. 2, 2000, which is a continuation of PCT international application serial number PCT/US99/09880 designating the U.S. filed on May 17, 1999, and which is a continuation-in-part of U.S. application Ser. No. 09/063,993 filed on May 17, 1998, now U.S. Pat. No. 6,054,844. This application is also a continuation-in-part of U.S. application Ser. No. 09/063,995 filed on Apr. 21, 1998, now U.S. Pat. No. 6,116,363, which is a continuation-in-part of 08/963,037 filed on Nov. 3, 1997, now U.S. Pat. No. 5,842,534, which is a continuation of Ser. No. 08/455,104 filed on May 31, 1995, now abandoned. Priority is claimed to each of the foregoing applications.

STATEMENT REGARDING FEDERALLY SPONSORED RESEARCH OR DEVELOPMENT

Not Applicable

REFERENCE TO A COMPUTER PROGRAM APPENDIX

Not Applicable

BACKGROUND OF THE INVENTION

1. Field of the Invention

The present invention generally pertains to an improved method for controlling the operating characteristics of an internal combustion engine coupled to a drive train having a continuously variable transmission or a properly spaced multi-speed transmission, and more particularly to a partial charge depletion and charge sustaining control method suitable for use with smaller battery packs.

2. Description of the Background Art

In U.S. Pat. No. 5,842,534, incorporated herein by reference, I described a charge depletion method and apparatus for operating the electric motor and small auxiliary power unit, such as an internal combustion engine, in a hybrid electric vehicle (HEV) separately or together depending upon the driving conditions. Operation of the electric motor and auxiliary power unit are coordinated so that the vehicle operates as zero emissions vehicle (ZEV) or electric car at all speeds below a cruising threshold, unless the depth of discharge of the batteries exceeds a charge threshold in which case the vehicle operates in an HEV mode. Further, the vehicle operates in an HEV mode at speeds above the cruising threshold. The batteries are depleted during operation and are not charged by the auxiliary power unit, except during emergencies in which case the batteries are only charged enough to provide a performance enhancement to the small auxiliary power unit. In operation, the vehicle speed is sensed, the level of the depth of discharge of the battery is sensed, at vehicle speeds above a threshold speed the auxiliary power unit is activated to power the vehicle and the electric motor is used to supplement the auxiliary power unit when required, at vehicle speeds below the threshold speed the auxiliary power unit is deactivated and the electric motor is used to power the vehicle, and the threshold speed is automatically and dynamically adjusted as a function of said level of the depth of discharge.

In U.S. Pat. No. 6,116,363, incorporated herein by reference, I described another charge depletion method and apparatus where operation of the electric motor and auxiliary power unit are coordinated as a function of a control policy for the auxiliary power unit based on desired least fuel consumption and/or vehicle emissions characteristics. In operation, the speed of the vehicle is sensed, the depth of discharge of the battery is sensed, at vehicle speeds above a threshold speed auxiliary power unit is activated to power the vehicle and the electric motor is used to supplement the auxiliary power unit when required, at vehicle speeds below the threshold speed the auxiliary power unit is deactivated and the electric motor is used to power the vehicle, and the threshold speed is dynamically adjusted as a function of the depth of discharge, wherein the threshold speed and adjustment of the threshold speed are a function of a control policy for the auxiliary power unit based on desired fuel consumption and/or vehicle emissions characteristics.

In my prior U.S. application Ser. No. 09/677,288 filed on Oct. 2, 2000, which is a continuation of PCT international application serial No. PCT/US99/09880 published on May 4, 2000 as International Publication No. WO 00/25417 and incorporated herein by reference, I described a control method for internal combustion engine electric hybrid vehicles that was designed to operate with a large battery pack or a high power battery pack. This approach was an improvement of the method described in my prior patent, U.S. Pat. No. 6,054,844, incorporated herein by reference, which describes a method and apparatus for controlling the power output of an internal combustion engine in a vehicle having a continuously variable transmission (CVT) or automatic transmission (AT): In these methods, a motor/generator is controlled to counteract the negative effect of the $-\dot{R}I_E S_E$ term in the dynamic equation $$\alpha_{DS} = \frac{-\dot{R}I_E S_E + T_E R - T_{loss} - T_{RL}}{I_{DS} + R^2 I_E}, \quad \dot{R} = \frac{dR}{dt}$$

representing the engine/transmission system where $\alpha_{DS}$= acceleration of the vehicle reflected to the drive shaft, $$R = \frac{S_E}{S_{DS}},$$

$I_E$=engine inertia, $I_{DS}$=vehicle inertia at the driveshaft, $S_E$=engine speed, $S_{DS}$=drive shaft speed, $T_E$=engine torque, $T_{loss}$=torque losses, and $T_{RL}$=road load torque at the driveshaft. The motor/generator, in counteracting counteract the negative effect of the $-\dot{R}I_E S_E$ in the dynamic equation, can then be used to allow the engine to operate at "wide open throttle" (WOT), or along the "Ideal Torque/Speed Operating Line" (IOL) for best efficiency and lowest emissions, or along any other predetermined operation line. In this way, the engine can be run continuously while energy flows into or out of the battery energy storage system connected to the electric motor/generator. If the battery is large enough to drive the vehicle a long distance, then the efficiency of energy into and out of the battery is high since the battery internal resistance is low. This concept is especially desirable for a charge depletion hybrid electric vehicle as described in my prior patent, U.S. Pat. No. 5,842,534 which is incorporated herein by reference, where the large battery pack is charged from stationary powerplants. With smaller battery packs, however, the efficiency of energy into and out of the battery is lower. Therefore, there is a need for a control method that is particularly suited for use with smaller batter packs.

BRIEF SUMMARY OF THE INVENTION

The present invention provides the needed control method for operating internal combustion engine electric hybrid vehicles with smaller battery packs, particularly in configurations where an electric motor (E/M) or electric motor/generator (E/MG), a battery, and associated controls are inserted between the engine and a continuously variable or automatic transmission.

According to an aspect of the invention, the interaction between the combustion engine and battery operated electric motor is controlled by taking energy into the batteries only if it is more fuel efficient than throttling the engine and operating the engine at a lower efficiency.

According to another aspect of the invention, the batteries are charged to a certain state or the batteries are maintained at a particular state of charge.

According to still another aspect of the invention, the engine "turn-on" speed is used to regulate the depth of discharge of the battery system by observing the average depth of discharge over a period of time and maintaining the depth of discharge between a maximum and minimum with the engine.

According to a further aspect of the invention, the depth of discharge of the battery system is cycled with the engine to maintain the depth of discharge between a maximum and minimum.

Furthermore, in accordance with another aspect of the invention, the average depth of discharge is maintained over a period of time that is long compared to driver action.

An aspect of the invention also includes a battery control method wherein a closed loop system is set to regulate depth of discharge of the battery with a frequency bandwidth sufficient to meet predetermined operating criteria such as battery life, vehicle range, and driveability.

An additional aspect of the invention is to regulate the depth of discharge of the battery system in a mechanical CVT hybrid electric vehicle without fully charging the battery with the engine.

Another aspect of the invention is to use vehicle speed as a determinant of vehicle energy demand.

Still another aspect of the invention is to provide a vehicle control system for a CVT engine-motor parallel prime mover, by using the electric motor and battery to provide acceleration and deceleration compensation for the CVT powertrain system dynamics. This provides higher level instant response and better fuel economy than can be achieved with an internal combustion CVT alone.

A further aspect of the invention is to optimize overall powertrain efficiency, by considering circulated energy through the E/M battery system by comparing engine throttle vs. E/M control for deceleration.

Further aspects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring now to FIG. 1 through FIG. 7, the present invention comprises a control method and system for operating internal combustion engine electric hybrid vehicles with smaller battery packs, particularly in configurations where an electric motor (E/M) or electric motor/generator (E/MG), a battery, and associated controls are inserted between the engine and a continuously variable or automatic transmission. It will be appreciated that when the term "battery" is used herein, the term can include any energy storage device such as an ultra-capacitor, electrochemical battery, or the like.

1. Applying Optimization Concepts to Determine When to Throttle the Engine or Provide Regeneration of the Batteries while Driving A first objective of this invention is to minimize the fuel consumption and emissions for a parallel hybrid electric powertrain given an engine, an electric motor/generator, a continuously variable transmission (CVT) or properly spaced multi-speed automatic transmission, a powertrain system computer controller, and a specific battery pack. Each of these components have losses when operating. This invention minimizes the sum of the losses of the components to provide the best conversion efficiency from liquid fuel to drive energy at the wheels. A second objective is to provide the best efficiency for recharging or maintaining the charge of the battery pack. The theory of operation is described in the following texts and figures.

Figure 1:
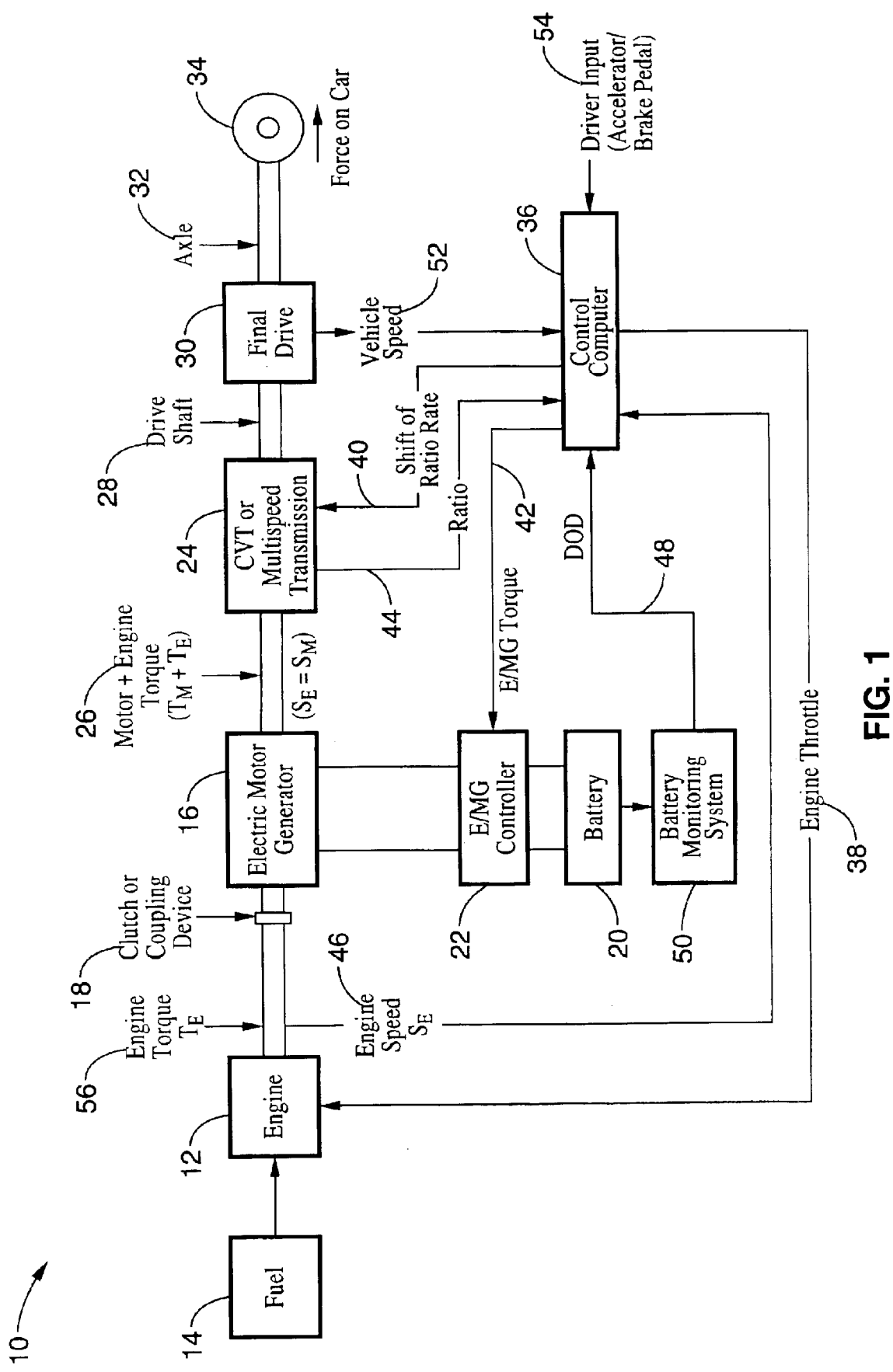
FIG. 1 is a block diagram of an engine, electric motor generator, CVT, battery and computer-controlled parallel hybrid powertrain configuration according to the present invention.

FIG. 1 shows a block diagram of an embodiment of a parallel hybrid electric CVT system 10 designed for low fuel consumption and emissions, and high performance according to the present invention. This figure shows an internal combustion engine 12 powered by a fuel supply 14, and an electric motor generator (E/MG) 16 coupled to the engine 12 either via a clutch 18 or other coupling device such as a torque converter, etc. E/MG 16 is powered by a battery 20, and the battery energy is controlled via an E/MG controller 22, which controls the torque on engine 12 applied by E/MG 16. E/MG 16 is coupled to a CVT or multispeed transmission 24 which receives, at its input, a combination of the engine torque (TE) and motor torque (TM) 26 and in turns a drive shaft 28. Drive shaft 28 is in turn coupled to a final drive 30 which turns an axle 32 which is coupled to the wheels 34. A control computer 36 sets the control parameters and monitors the operation of the system. The control parameters include, for example, the engine throttle 38, shift of ratio rate (rate of change of ratio) 40 of the CVT or multispeed transmission 24, and E/MG torque parameters 42 for controller 22. Operational characteristics that are monitored include the ratio 44 of the CVT or multispeed transmission 24, engine speed (SE) 46, depth of discharge 48 of the battery provided by a battery monitoring system (computer) 50, vehicle speed 52, and driver input 54 (e.g., accelerator/brake pedal motion). Engine torque (TE) 56 to the extent required is not measured directly but is derived from the ideal operation line (IOL).

Figure 2:
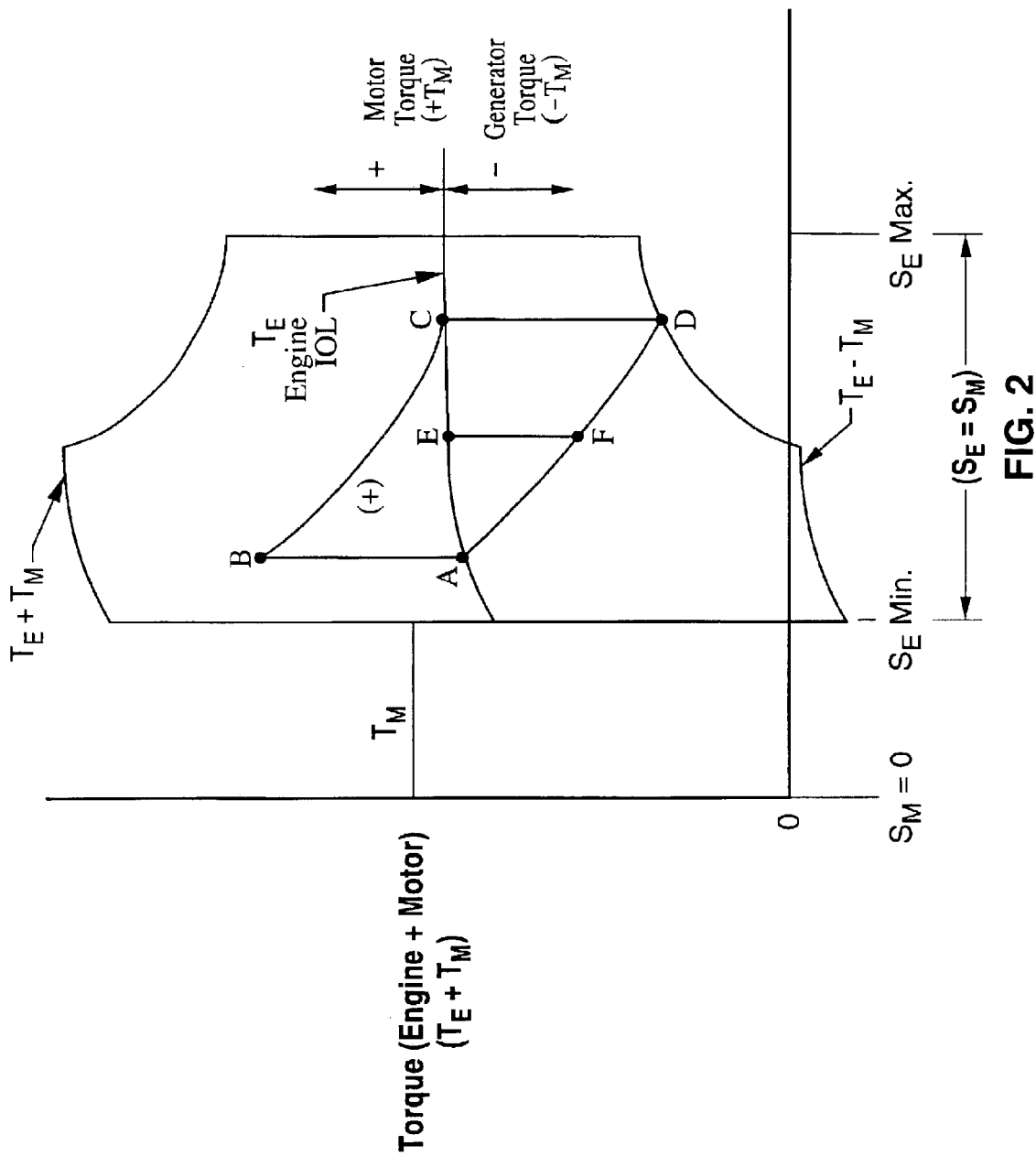
FIG. 2 is a graph of a typical acceleration/deceleration cycle in the HEV mode where battery status to be controlled with the accelerator pedal showing combined engine and electric motor torque—speed characteristics and engine efficiency in accordance with the present invention.

FIG. 2 shows a typical acceleration/deceleration cycle with the accelerator pedal. Positive (+) torque (+$T_M$) means the E/MG is taking energy from the batteries, and negative (−) torque (−$T_M$) means the E/MG is acting as a generator to recharge or regenerate the batteries. The cycle begins with the vehicle operating at a steady state on a level road with the accelerator pedal in a particular position. The driver suddenly decides that he needs to accelerate the vehicle. The accelerator pedal in this powertrain system commands "power," and as it is suddenly moved to a new operating position, torque from the electric motor will be increased to reach the required power instantly. Then power is held according to the accelerator pedal command and the CVT ratio is changed to increase the gasoline engine power by changing its speed and throttle position so that it remains on the ideal operating line (IOL). The electric motor (E/MG) torque is decreased keeping a constant total power curve until the E/MG torque reaches zero. A new higher power is reached along the ideal operating line (IOL) of the engine. The energy required to do this must originate from the batteries and is supplied by the electric motor. Thus, starting from operating point "A" the engine and E/MG will move to point "B" instantly supplying more torque and power. The E/MG torque decreases along a constant power line BC as the ratio of the CVT is changed until a new operating point C is reached. This power level and operating point of the engine will be maintained as long as the accelerator pedal is held in a fixed position. The CVT will change ratio as the vehicle accelerates. When the driver decides to return the accelerator pedal to the power level corresponding to point "A" (where the cycle started) the electric motor generator will provide a negative torque to lower the power level at "C" to the power level of line AD almost instantly. Then this negative E/MG torque will cause the engine speed to decrease along the IOL to point "E". Since the load (torque) on the engine is high and the throttle is not closed, the engine continues to operate at high efficiency and low emissions. The E/MG is used to "drag" the engine speed down and consequently the power down to "E". The power generated then returns to the batteries up to point E, the electric motor torque is decreased to zero, and the engine throttle is decreased to the power level of the curve from "D" to "A". This level of power is indicated by point "F". The points "E" and "F" are chosen by a computation of efficiencies where there is equal or higher efficiency by engine throttle than by regeneration through the battery electric motor system. (The electric motor generator and battery system efficiency may be about (0.9G×0.9B×0.9BX×0.9M)=0.65). Thus, point "E" is determined by when the brake specific fuel consumption (BSFC) of the engine is increased more than 35% to achieve the power reduction desired at point "F". At this point, the E/MG torque is set to zero and the throttle of the engine is reduced to satisfy the power command.

Figure 3:
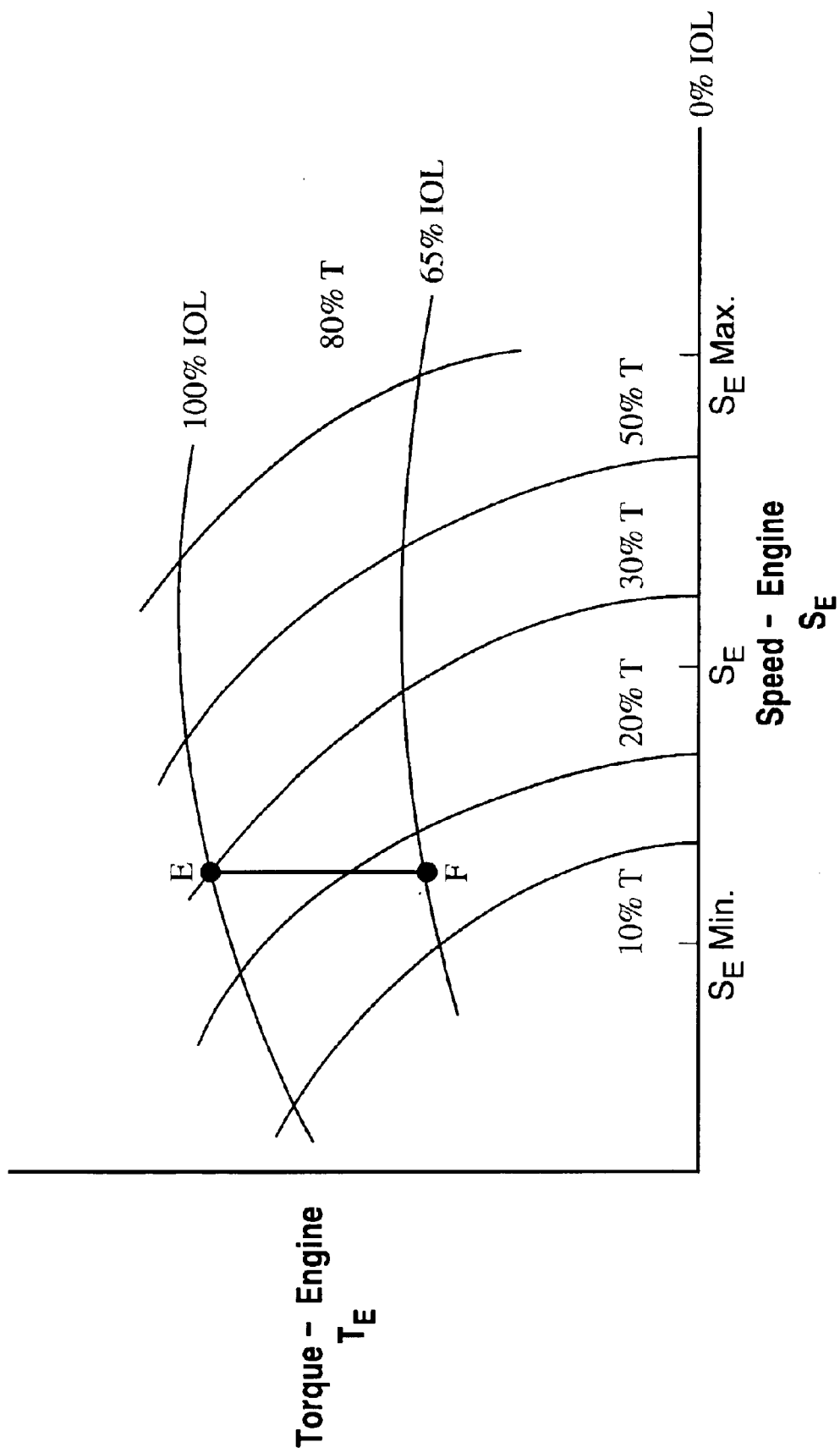
FIG. 3 is a graph showing engine throttle—torque—speed curves in relation to the ideal operating line (IOL) in accordance with the present invention for the 100% IOL line, the 65% IOL line, and the 0% IOL.

FIG. 3 shows the engine throttle curves in relation to the ideal operating line (IOL). Shown on this figure are the 100% IOL line, the 65% IOL line, and the 0% IOL line. These lines then determine the engine efficiency relative to the IOL. Thus the 65% IOL line is about 65% as efficient (or 35% higher BSFC) as the 100% IOL operating line. Deceleration torque "E" to "F" can be accomplished by a throttle change from 30% to 18% or by regenerated energy to the battery. Regeneration has a loss of energy due to a generator-battery-motor loss of approximately 35%.

Figure 4:
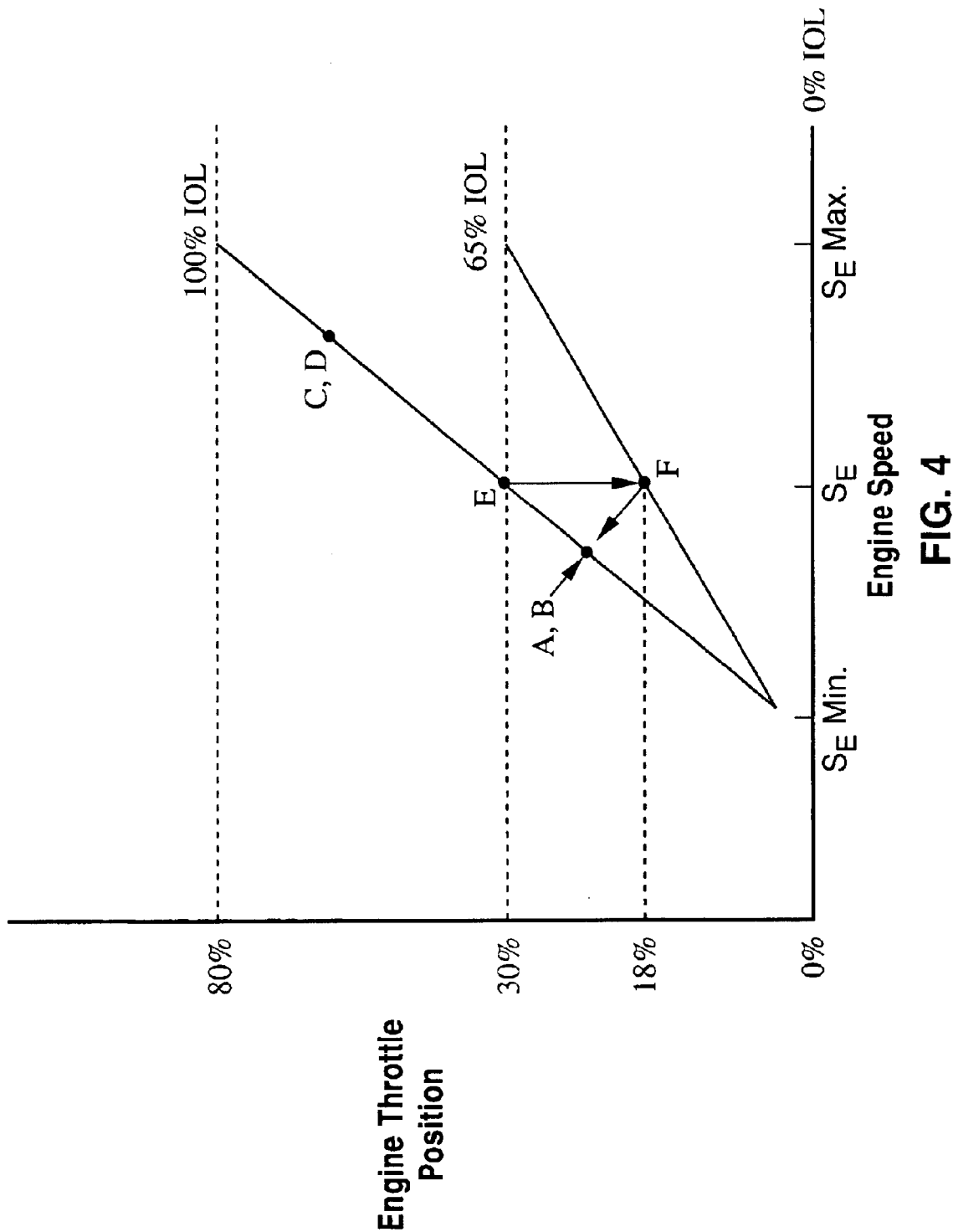
FIG. 4 is a graph of throttle-speed curves showing a throttle schedule during an acceleration-deceleration cycle according to the present invention derived from the curves shown in FIG. 3.

The throttle/speed curves of FIG. 4 are derived from the curves in FIG. 3.

FIG. 4 shows the engine throttle as the accelerator pedal was increased from power "A" to "B-C" and returned to "A" going through point "E" on the IOL. The engine throttle is reduced to approximately the 65% IOL line at this instant to point "F". This point "E" is where the loss of engine efficiency due to throttling is less than the losses through the electrical system. The power from point "F" to "A" is held constant with engine throttle modulation until "A" is reached again. The electric motor generator torque is set to zero from "F" to "A."

Figure 5:
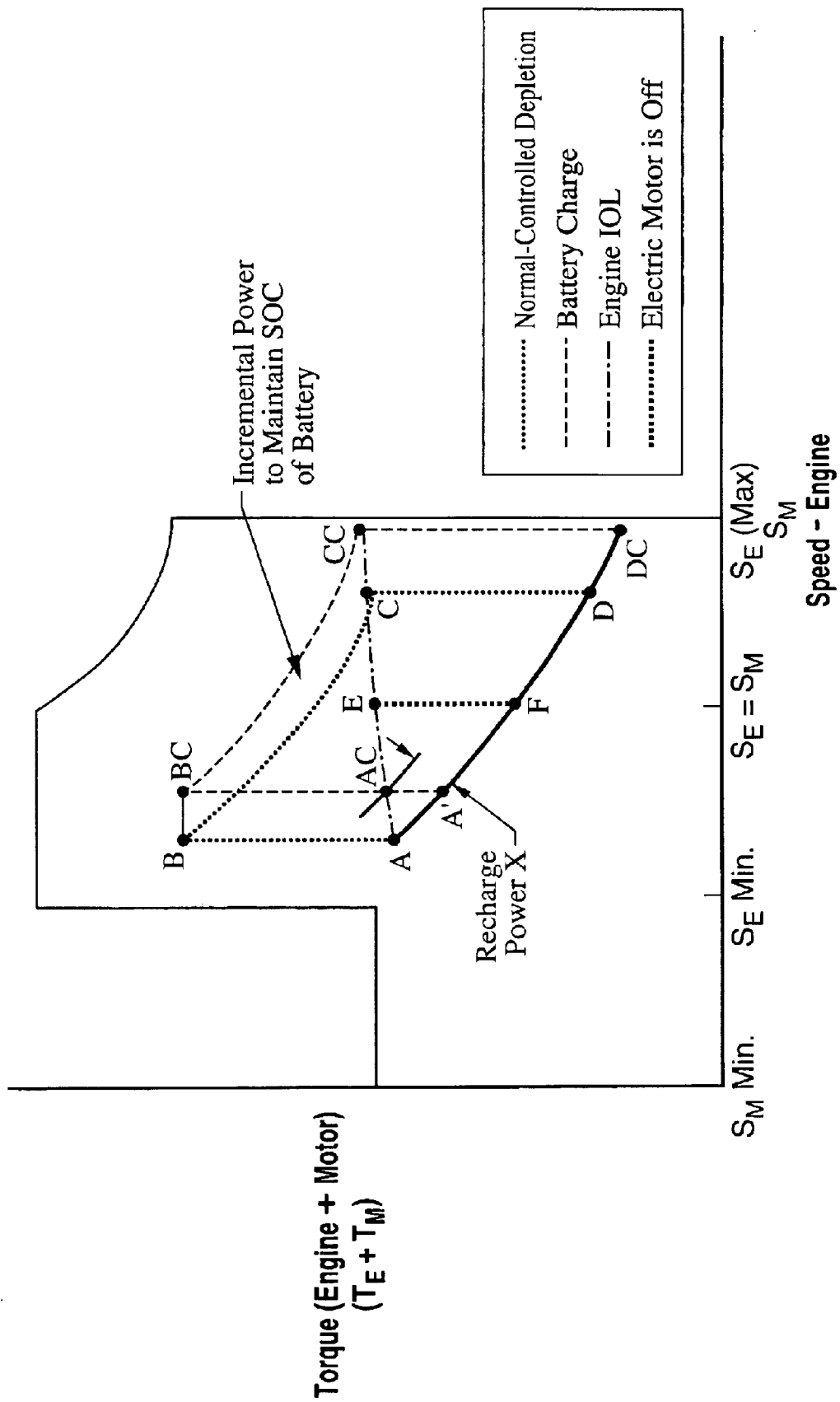
FIG. 5 is a battery regeneration control graph depicting incremental battery depth of discharge maintenance according to the present invention.

FIG. 5 shows a battery regeneration control graph and how the gasoline engine torque speed trajectory changes and allows the main battery charge to increase or the depth of discharge (DOD) to decrease. The charge in the battery increases as operation moves to the right in the graph.

Figure 6:
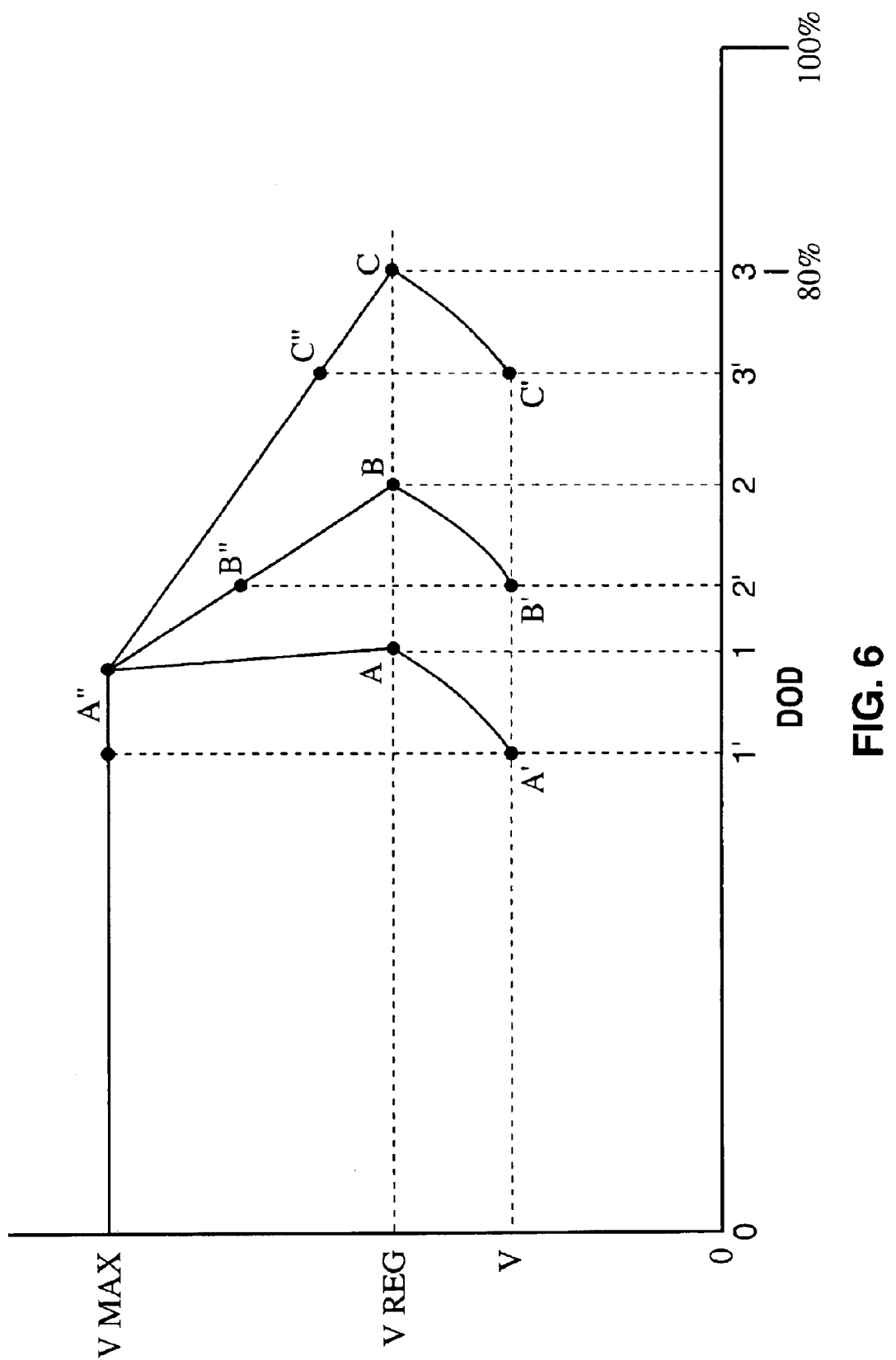
FIG. 6 is a graph depicting an alternative charge maintenance control by a charge depletion control system showing how the engine "turn on" speed cycles and allows the DOD to cycle about a given state depending on the driving conditions.

FIG. 6 shows how the engine "turn on" speed cycles and allows the DOD to cycle about a given state depending on the driving conditions. The premise is that each "average" operating speed has a "turn on" speed which will maintain the charge. If so, then we can regulate the battery state of charge (SOC) by "turn on" speed depending on the slope A"A, A"B, or A"C. The regulation fidelity is best with A"C. Additional information can be found in my prior U.S. Pat. No. 5,842,534 and U.S. Pat. No. 6,116,363, both of which are incorporated herein by reference.

2. Determining the Operating Line of the System to Maintain the Charge in the Batteries or to Recharge the Batteries to a Higher State The second objective of this invention is to provide a technique for operating the vehicle while simultaneously maintaining or increasing the battery state of charge.

Referring again to FIG. 5, a technique to regenerate the batteries with the liquid fuel engine if needed is shown. The regeneration period should occur over a relatively long period of time or at a low current so that the recharge losses are minimized. The engine is to be kept operating at the IOL but the vehicle maximum performance may be reduced slightly. The charge rate should be low. The battery regeneration power level is chosen so that it approximately matches the average power of the vehicle while driving. If this power setting is low relative to the average load, the batteries will slowly discharge. If the setting is high relative to the average then the state of charge will gradually creep up. The objective is to set the charge level so that the average state of charge creeps up and down at a low frequency relative to the drivers' action. The frequency of cycling should be less than $1/10^{th}$ the frequency of the driver action at the accelerator pedal. The cycling frequency may be related to the battery pack size and other system parameters. The larger the battery pack, the lower this charge frequency response may be and the more robust the control system. Or, the bandwidth of energy management should be approximately $1/10^{th}$ the driver's bandwidth. The driver's bandwidth should be approximately $1/10^{th}$ the bandwidth of the internal component controllers, such as the pressure controllers of the CVT and the engine throttle controller. This separation of operating frequencies allows the vehicle to achieve robust control. Prediction or "fuzzy" concepts may be required for smaller battery packs. These control frequency ranges may overlap, thus making prediction necessary. Boundaries of these control ranges can always be reached by excessive use of the system in some way that is out of the ordinary. The important feature is that these boundaries are seldom reached and when they are reached the driver knows what alternative action is needed to correct the deficiency.

For example, if the batteries are being discharged and the regeneration level is too low, the driver may simply go easier on the accelerator pedal or the computer may set the recharge level slightly higher, meaning the battery regeneration power level in FIG. 5 is set higher. Such action may be taken by a computer or manually by the driver which makes the system under manual control but such manual control is not necessary in general and once the level of charge is set for a particular driver it may not have to be adjusted again. This level of battery maintenance may be related to the way a person drives. The vehicle can be set to the average driver and the driver could tune above or below this setting. The car would not be put into jeopardy in any way by this control. Only system efficiency is affected.

Where the power to regenerate the batteries is determined by the control computer to be "X" kilowatts, the gasoline engine is set to operate at a power level higher than required to maintain vehicle speed. If the cycle described under normal level road conditions as described above starts at point A in FIG. 2, then due to battery direct charge command, the engine operating point is moved to point AC to the right along the IOL. Thus, at steady state cruise point AC supplies the road load and charge load "X". If the accelerator pedal moves suddenly to accelerate the car, then the operating point moves to BC. The incremental power is the same as in FIG. 2. Thus the vehicle acceleration is not affected under normal operation. The battery charge curve simply moves to the right to the points AC, BC, CC, and DC. The points E, F remain the same. As the level of negative power reaches A' the engine throttle is opened to operate on the IOL and the EMG is set to charge the batteries at the level at the start of this example cycle.

When the brake pedal is depressed, the braking policy described in my International Publication No. WO 00/25417 and my prior patents U.S. Pat. No. 5,842,534, U.S. Pat. No. 6,054,844, and U.S. Pat. No. 6,116,363 is invoked as before.

The amount of "charge power" required to maintain battery state of charge is determined by the amount of deficit from the ideal set by a system control policy. The "gain" on charge power deficit will determine the time constant of the charge. This charge policy is not normally needed since the charge depletion policy of U.S. Pat. No. 5,842,534 accounts for most of the transition from charge depletion to charge sustaining.

Note that the normal "charge depletion" algorithm of U.S. Pat. No. 5,842,534, depletes charge by control of engine "turn on" speed shown in FIG. 4 of that patent. If this speed is high (e.g., "highway" driving) the battery depletes as the vehicle drives. For "city" driving, however, FIG. 6 herein shows an improved control policy which allows the vehicle to use more gasoline and less electric energy on a given driving cycle, as the DOD increases, until points A, B or C. Here, the engine, motor, CVT, and computer controller would control the engine "turn-on" speed and DOD control line to maintain a DOD set in the computer. The control lines A, B, and C in FIG. 6 indicate three example DOD's that can be maintained with this policy in a particular low speed driving cycle. This policy should regulate a "turn-on" velocity for a consistent driving cycle. The system will deplete the battery to DOD 1, 2, or 3 corresponding to "turn on" policies A, B, or C, respectively. For more positive regulation, the "turn-on" speed can be lowered to V MIN and observe the DOD. If the DOD decreases to A', B' and C' respectively, then the battery charges. At this point the control computer can switch the "turn-on" speeds to A", B" and C" respectively. The DOD will then cycle between 1 & 1' or 2 & 2' or 3 & 3'. The advantage of this concept is that battery state is maintained by regenerative braking and engine control energy with no "direct" or intentional charge. Thus, efficiency is the highest possible. If the use of this method is not adequate to maintain the DOD, then the above-described policy of engine power control can be used in addition.

During highway cruise, at high velocities above V MAX, there may not be enough deceleration events with enough energy to maintain a certain DOD. Then the computer control concept of FIG. 5 would be used to increase the engine power operating point by increasing the engine speed, while operating the engine along the IOL, as described in the second paragraph of this Section 2 above. The control computer will determine the amount of charge power dependent on DOD error, charge rate and a control loop frequency determined by driving characteristics. It is desired to maintain the DOD at a relatively low frequency compared to the driver accelerator pedal frequency.

Figure 7:
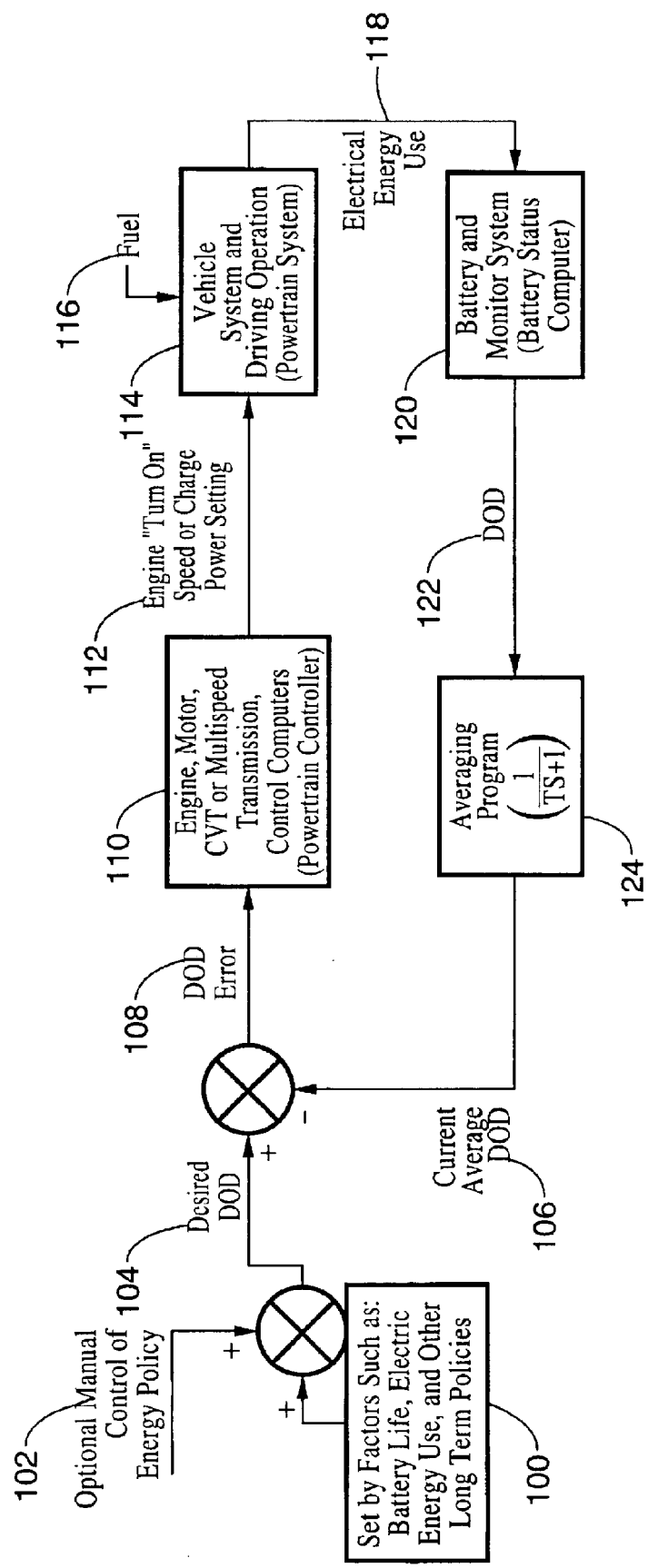
FIG. 7 is a control diagram for battery charge maintenance by control of an engine, E/MG, and CVT or multi-speed transmission according to the present invention.

The block diagram of FIG. 7 depicts a general implementation for the policies discussed above. The policies are set by factors 100 such as battery life, electric energy use, and other long term factors or policies and, if desired, an optional manual control (e.g., override switch) 102 can be provided. The desired depth of discharge 104 is then compared with the current average depth of discharge 106 and an error signal 108 is output to the powertrain controller (e.g., engine, motor, CVT or multispeed transmission control computers) 110. The output of powertrain controller 110 is the engine "turn on" speed or charge power setting 112 which is input to the powertrain system (e.g., engine, motor, CVT or multispeed transmission) 114 along with fuel 116. The electrical energy use 118 is monitored by the battery status computer 120 where the battery depth of discharge 122 is determined in real time. The real-time depth of discharge measurements are time averaged in an averaging program 124 to generate the current average DOD 106.

3. Low to Zero Accelerator Pedal Command Operation

At low to zero accelerator pedal depression, it is preferably to use the CVT or transmission to control the engine to operate at its minimum speed. This minimum speed is maintained at closed throttle and fuel shut off. The negative power at this minimum engine speed is low and provides a natural source of deceleration for a "normal" driveability feeling. Further, since the negative power is low, for good driveability the engine clutch may not be opened. The engine clutch opening would occur at low vehicle speeds set by other policies discussed above.

For long mountain grade deceleration where this battery system can no longer accept charge, a mountain drive mode (e.g., low gear selection such as D1 or D2 in a transmission), may be desired. This is easily accomplished by setting the minimum engine speed higher, thereby providing high or engine deceleration power and closed throttle and zero fuel.

Accordingly, the present invention provides a number of advantages over other control methods, including, but not limited to:

1. Regulating the DOD of the battery system by the use of engine "turn-on" speed for low speed city driving;

2. Regulating the DOD of the battery system by averaging the DOD over a long period, long compared with driver action;

3. Setting a closed loop system to regulate DOD of a hybrid electric vehicle with a frequency bandwidth low enough to maximize battery life, range, etc.;

4. Depleting the batteries to provide direct "wall-plug" electric vehicle propulsion energy, but not recharging with gasoline to full charge. The engine is used to maintain a level of DOD which is sufficient to anticipate all expected energy requirements within a driving cycle; and 5. Using vehicle speed as a determinant of driving energy demand. For example, 60 mph and above is considered highway driving. Below 60 mph is considered city driving. Thus the proposed control policy is changed according to vehicle speed. It is understood that other control details such as driving histories, time in a driving state, and other factors may be used to practically implement these controls.

Furthermore, those skilled in the art will readily appreciate that the control methods, policies and/or algorithms of the present invention may be implemented on any conventional computer system under processor control using conventional programming techniques.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. In a hybrid electric vehicle having a internal combustion engine, an electric motor, and a battery system and controller for powering the electric motor, the improvement comprising:

providing a transmission between said electric motor and a set of wheels in said vehicle; and controlling interaction between the internal combustion engine, the electric motor and the transmission to regenerate energy into the battery system only if engine fuel efficiency during regeneration and during subsequent power production from the electric motor is greater than engine fuel efficiency resulting from throttling the engine to reduce engine/motor power.

2. A method for controlling the power output of an internal combustion engine and electric motor operated by a battery system and controller in a hybrid electric vehicle, comprising:

providing a transmission between said electric motor and a set of wheels in said vehicle; and controlling interaction between the internal combustion engine, the electric motor and the transmission to regenerate energy into the battery system only if engine fuel efficiency during regeneration and during subsequent power production from the electric motor is greater than engine fuel efficiency resulting from throttling the engine to reduce engine/motor power.

3. An apparatus for controlling the power output of an internal combustion engine and electric motor operated by a battery system and controller in a hybrid electric vehicle, comprising:

a computer; and programming associated with said computer for controlling interaction between the internal combustion engine, the electric motor and a transmission between the electric motor and a set of wheels in the vehicle to regenerate energy into the battery system only if engine fuel efficiency during regeneration and during subsequent power production from the electric motor is greater than engine fuel efficiency resulting from throttling the engine to reduce engine/motor power.

4. An improvement as recited in claim 1, wherein said transmission comprises a multispeed transmission.

5. An improvement as recited in claim 1, wherein said transmission comprises a continuously variable transmission.

6. A method as recited in claim 2, wherein said transmission comprises a multispeed transmission.

7. A method as recited in claim 2, wherein said transmission comprises a continuously variable transmission.

8. An apparatus as recited in claim 3, wherein said transmission comprises a multispeed transmission.

9. An apparatus as recited in claim 3, wherein said transmission comprises a continuously variable transmission.

* * * * *

UNITED STATES PATENT AND TRADEMARK OFFICE
CERTIFICATE OF CORRECTION

PATENT NO. : 6,847,189 B2 Page 1 of 1
APPLICATION NO. : 10/606128
DATED : January 25, 2005
INVENTOR(S) : Andrew A. Frank It is certified that error appears in the above-identified patent and that said Letters Patent is hereby corrected as shown below:

At column 1, line 30, replace the paragraph "Not Applicable" with the following:

This invention was made with Government support under Grant No. MDA972-95-1-0010, awarded by the Department of the Army. The government has certain rights in this invention.

Signed and Sealed this

Twelfth Day of February, 2008

JON W. DUDAS
*Director of the United States Patent and Trademark Office*